United States Patent Office

3,346,542
Patented Oct. 10, 1967

3,346,542
ADDITION OF CALCIUM HEXAFLUOROSILICATE OR HEXAFLUOROSILICIC ACID AS HAZE INHIBITOR DURING TWO-STAGE CATALYTIC PRODUCTION OF POLYETHYLENE TEREPHTHALATE
Hans-Martin Koepp, Obernburg (Main), Erhard Siggel, Laudenbach (Main), and Hilmar Roedel, Elsenfeld, Germany, assignors to Vereinigte Glanzstoff-Fabriken AG., Wuppertal-Elberfeld, Germany
No Drawing. Filed Mar. 2, 1964, Ser. No. 348,846
Claims priority, application Germany, Mar. 9, 1963, V 23,779
9 Claims. (Cl. 260—75)

ABSTRACT OF THE DISCLOSURE

Process for the production of polyethylene terephthalate requiring a first stage transesterification of dimethyl terephthalate with ethylene glycol in the presence of an alkaline earth metal or compounds thereof as the transesterification catalyst followed by a second stage polycondensation in the presence of any conventional polycondensation catalyst, wherein the occurrence of haze in the polyester product is inhibited by introducing small amounts of calcium hexafluorosilicate or hexafluorosilicic acid into the reaction mixture just prior to or at the beginning or during the second stage catalytic polycondensation.

---

This invention is concerned with the production of linear fiber-forming polyesters of terephthalic acid from ethylene glycol and terephthalic acid dimethyl ester, and more particularly, the invention is directed to an improvement in the production of such polyesters where a transesterification catalyst containing an alkaline earth metal is required.

In the synthesis of high molecular weight polyesters from ethylene glycol and terephthalic acid dimethyl ester, a well known procedure is followed whereby in a first reaction stage the terephthalic acid dimethyl ester is esterinterchanged with ethylene glycol to form the corresponding terephthalic acid diglycol ester. This diglycol ester is then polycondensed in a second reaction stage, so as to split off ethylene glycol and form the linear polyester.

In order to obtain a polymer which is as colorless as possible, it is necessary to catalytically accelerate both reactions, i.e. both the ester-interchange and the polycondensation. However, the metal compounds commonly used as catalysts remain in the polymer and later influence the properties and behavior of the finished polyesters. This is especially true when the catalyst-containing polyester is subjected to high temperatures, and melted for processing into shaped articles such as films, filaments or the like.

In particular, the ester-interchange catalysts present in the polymer tend to bring about decomposition reactions which in turn cause a lowering of the molecular weight and the melt viscosity.

This phenomenon, which may also be designated as a lowering of the melt stability, occurs to a much lesser degree if ester-interchange catalysts containing alkaline earth metals are used in the production of the polyethylene terephthalate. On the other hand, it is well known that an addition of calcium, strontium, barium, or their derivatives such as their oxides or salts to the ester-interchange mixture leads to the occurrence of very undesirable cloudings or precipitates in the finished polyester. The polyester then acquires a very dull and cloudy appearance. The precipitates are deposited, moreover, on the walls of the reaction vessels so as to diminish the heat transfer between the wall and the reaction mixture, thereby requiring frequent and expensive cleaning operations. Finally, the precipitates cause a relatively rapid clogging of filter surfaces where the finished polymer must be filtered in the molten state before molding or extrusion, for example as is necessary in the spinning of filaments. However, a completely adequate filtering off of the precipitates at this point is impossible. The shaped products such as filaments or fibers retain the cloudy-dull appearance, which is especially undesirable in the production of non-matted objects, for example, shiny or lustrous threads, yarns or fabrics.

It is known that the addition of phosphoric acids or their compounds reduces or prevents a cloudy appearance in some cases. Thus, if sufficient phosphoric acid is added after transesterification, it is possible to substantially avoid the cloudiness caused by calcium compounds. However, the dull or cloudy appearance which is brought about by strontium or barium compounds as ester-interchange catalysts cannot be reduced or adequately prevented by the introduction of such known additives. Moreover, the known additives bring about a considerable retardation or slowing down of the polycondensation reaction, as can be seen from the following Table I in which phosphoric acid itself is the additive.

TABLE I

The quantitative data in the first three columns are given as molar percent with reference to the dimethyl terephthalate reactant. Polyethylene terephthalate was produced in each test with an LV=1.65 (melt viscosity).

| Ester-interchange catalyst | Polycondensation catalyst— | Phosphoric acid | Reaction time for the polycondensation, Minutes |
|---|---|---|---|
| Calcium acetate | Antimony trioxide | | |
| 0.086 | 0.01 | None | 160 |
| 0.086 | 0.01 | 0.053 | 190 |
| 0.086 | 0.01 | 0.088 | 250 |
| Strontium acetate | | | |
| 0.086 | 0.01 | None | 120 |
| 0.086 | 0.01 | 0.08 | 195 |

The longer reaction times when using phosphoric acid cause an undesired acceleration of side reactions and the formation of decomposition products. The characteristic color of the finished polyesters is impaired, and the throughput capacity is considerably reduced so that the production of the polyester becomes very inefficient.

The primary object of the present invention is to provide an improved production of polyethylene terephthalate through the use of a transesterification catalyst containing an alkaline earth metal while avoiding the cloudy or dull appearance of the polyester and other disadvantages attributed to this type of catalyst.

Another object of the invention is to eliminate cloudiness from the polyester product by means of a specific additive while preserving the improved melt stability and other favorable effects resulting from the use of an alkaline earth metal transesterification catalyst.

Other objects and advantages of the invention will be more apparent from the following detailed description, it being understood that various changes and modifications can be made in the conventional methods of producing polyethylene terephthalate without departing from the distinct and essential improvement described and claimed hereinafter.

In accordance with the present invention, it has now been found that a clear and unclouded polyethylene terephthalate can be obtained together with the advantages of a transesterification catalyst containing an alkaline earth metal by carrying out the first stage ester-interchange between dimethyl terephthalate and ethylene glycol and the second stage catalytic polycondensation reaction in a conventional manner and with the known alkaline earth metal transesterification catalysts and the usual polycondensation catalysts, provided that the second stage polycondensation of the diglycol terephthalate is also carried out in the presence of calcium hexafluorosilicate or the free hexafluorosilicic acid itself. The calcium hexafluorosilicate or hexafluorosilicic acid or mixtures thereof can be introduced into the diglycol terephthalate reaction mixture or product after substantial completion of the ester-interchange reaction or at the beginning or during the course of the polycondensation reaction in an amount of at least about 0.001, preferably about 0.01 to 0.1 mol percent, with reference to the number of mols of the initial dimethyl terephthalate reactant.

It has also been found that other metal salts of hexafluorosilicic acid tend to bring about a reduction or elimination of the clouding caused by alkaline earth metal catalysts. However, these other metal salts either do not dissolve in the reaction mixture or else they have a poor effect on the melt stability of the polyethylene terephthalate being produced in their presence. Thus, these other salts are not actually effective and their addition may even nullify the specific improvement of the alkaline earth metal catalysts in a manner contrary to the objects of the present invention.

The addition of even very slight amounts of calcium hexafluorosilicate or free hexafluorosilicic acid are extremely effective. In comparison to known additives for prevention of the clouding caused by ester-interchange alkaline earth metal catalysts, considerably smaller amounts of hexafluorosilicic acid or calcium hexafluorosilicate can be used in order to achieve a product which is free of clouding. For example, the addition of only 0.01 mol percent of hexafluorosilicic acid prevents the clouding to a greater extent than does an addition of 0.07 mol percent of phosphoric acid. The clouding caused by strontium- and barium-containing transesterification catalysts cannot be eliminated by using phosphoric acid but can be eliminated in an excellent manner by addition of hexafluorosilicic acid or calcium hexafluorosilicate in accordance with the invention. Furthermore, hexafluorosilicic acid and calcium hexafluorosilicate have no inhibiting or retarding effect of any kind on the polycondensation reaction, as will be apparent from the following Table II.

In the following table and elsewhere in this specification the term "melt viscosity" refers to the viscosity of the polyester product measured as a 1% meta-cresol solution thereof at 25° C. The actual value being measured may also be referred to as the solution viscosity and abbreviated "LV," this value providing a means of determining the extent to which the polycondensation reaction has been completed and the approximate molecular weight of the linear polyester product.

TABLE II

The quantitative data in the first three columns are given in molar percent with reference to the dimethyl terephthalate reactant. Polyethylene terephthalate was produced in each case with an LV=1.65 (melt viscosity).

| Ester-interchange catalyst | Polycondensation catalyst — Antimony trioxide | Hexafluorosilicic acid or calcium hexafluorosilicate | Reaction time of the polycondensation in minutes |
|---|---|---|---|
| Calcium acetate | | | |
| 0.036 | 0.01 | None | 160 |
| 0.036 | 0.01 | 0.01 $CaSiF_6$ | 150 |
| 0.036 | 0.01 | 0.013 $H_2SiF_6$ | 161 |
| Strontium acetate | | | |
| 0.086 | 0.01 | None | 120 |
| 0.036 | 0.01 | 0.02 $CaSiF_6$ | 115 |

Even if larger amounts of hexafluorosilicic acid or calcium hexafluorosilicate are added, there is no appreciable retardation or slowing down of the polycondensation reaction. On the other hand, amounts of more than 0.1 mol percent are not necessary in order to solve the basic problem of clouding. It is also possible, of course, to use mixtures of calcium hexafluorosilicate with free hexafluorosilicic acid within the same molar percentages.

Alkaline earth metals and their compounds which have a favorable effect as transesterification catalysts on the melt stability of polyethylene terephthalate include the following: the alkaline earth metals calcium, strontium and barium; alkaline earth metal oxides, alkaline earth metal hydrides, alkaline earth metal alcoholates; and also the salts of the alkaline earth metals with orgnic acids. Especially suitable are the salts of these alkaline earth metals with aliphatic monocarboxylic acids, preferably fatty acids of from 2 to 20 carbon atoms such as the acetates or the stearates.

The polycondensation which follows the ester-interchange reaction can be accelerated by using any of the conventional catalysts in this art. For example, typical polycondensation catalysts are the oxides of boron, lead, germanium or antimony.

Small amounts of other polymers, such as polyethylene isophthalate, may also be added to the polyethylene terephthalate. It is also possible according to the process of the invention to produce mixed polyesters of polyethylene terephthalate, for example, by the addition of small amounts of isophthalic acid or the sodium salt of sulfo-isophthalic acid. These and similar minor modifications of the polyethylene terephthalate itself can be made without departing from the spirit or scope of the invention which is essentially concerned with overcoming the objectionable clouding caused by the alkaline earth metal catalysts.

Other than the special additives of this invention, the ester interchange and polycondensation reactions for the production of polyethylene terephthalate may be executed continuously or discontinuously in known manner under the usual pressure and temperature conditions. Any conventional apparatus can be used for these reactions and special techniques are not necessary. These conventional conditions and apparatus are so well known as to require no elaborate description. Molar percentages in all cases are with reference to the initial dimethyl terephthalate.

The following examples will further explain the invention, and these examples are intended to be illustrative only and not exclusive.

Example 1

1 kilogram of dimethyl terephthalate was melted in admixture with 1 kilogram of ethylene glycol while adding 0.086 mol percent of calcium acetate, with reference to the dimethyl terephthalate, in a stainless steel container holding about 3 liters. Within 90 minutes the temperature of the reaction mixture was raised from 150° C. to 210°

C. The liberated methanol distilled off through a packed column placed on top of the reaction vessel. There were then added 0.014 mol percent of hexafluorosilicic acid in the form of a 33% solution in water and 0.01 mol percent of antimony trioxide, and the ester interchange product was run off into a stainless steel autoclave provided with an agitator and preheated to 250° C. After 15 minutes agitation, the temperature of the autoclave was raised to 280° C., and after 15 more minutes a vacuum was applied. After a polycondensation time of 160 minutes, during which time a reduced pressure of about 0.2 mm. Hg was achieved, a bright and clear polyethylene terephthalate was obtained with a melt viscosity, as measured in m-cresol at 25° C., of 1.62 and a softening point of 262.3° C. The molten polyester was drawn off as a band, solidified and granulated.

The polyethylene terephthalate produced in this manner exhibited no cloudy precipitations either in solid form or in molten form at 280° C. Even after several repeated polycondensations in the same reaction vessel, it was not possible to observe any material deposited on the walls of the autoclave. In the molten form, after 40 minutes standing time at 280° C., the reduction in the melt viscosity was clearly less than in the case of a polyethylene terephthalate produced for purposes of comparison with the addition of 0.013 mol percent zinc acetate and 0.013 mol percent antimony trioxide as ester-interchange catalyst and polycondensation catalyst, respectively, but without the addition of hexafluorosilicic acid.

*Example 2*

1 kilogram of dimethyl terephthalate was ester interchanged with 1 kilogram of ethylene glycol in the same manner as described in Example 1, with the addition of 0.086 mol percent of calcium acetate as the ester-interchange catalyst. Before the start of the polycondensation reaction, there were added 0.009 mol percent of calcium hexafluorosilicate and 0.01 mol percent of antimony trioxide. In the same manner as Example 1, polycondensation was then carried out for which a period of 150 minutes was required. A polyethylene terephthalate was thus obtained with a softening point of 261° C. and a melt viscosity of 1.62. The polyester product in the solid as well as in the molten state, even after relatively long standing, exhibited no cloudy precipitations. The viscosity reduction after 40 minutes of standing at 280° C. was considerably less than in the case of the control sample as mentioned in Example 1.

*Example 3*

100 grams of diemethyl terephthalate and 100 grams of ethylene glycol were melted in a glass apparatus with the addition of 0.086 mol percent of strontium acetate. The temperature was raised within 120 minutes from 190° C. to 240° C. After expiration of this time, there were added 0.01 mol percent of antimony trioxide and 0.019 mol percent of calcium hexafluorosilicate. With an outside temperature of 282° C. the reaction material was allowed to stand for 30 minutes under normal pressure. A vacuum was then applied so as to obtain a reduced pressure of 0.3 mm. Hg after a period of 20 minutes. After a further reaction time of 120 minutes, there was obtained a polyethylene terephthalate having a melt viscosity of 1.70 and the product contained no cloudy precipitations but did show the desired improvement in melt stability.

*Example 4*

In the same manner as described in Example 3, 100 grams of dimethyl terephthalate were ester interchanged with 100 grams of ethylene glycol, this time with the addition of 0.086 mol percent of barium acetate. There were then added 0.01 mol percent of antimony trioxide and 0.04 mol percent of hexafluorosilicic acid. A bright polyethylene terephthalate was obtained with substantially the same physical properties as in the preceding examples, and even after relatively long standing of this polyester at 280° C., it did not show any cloudy precipitations. As compared to a polyethylene terephthalate produced in the usual manner with zinc acetate and antimony trioxide, rather than with an alkaline earth metal transesterification catalyst, the polyethylene terephthalate produced according to this example had a considerably better melt stability.

The invention is hereby claimed as follows:

1. In the production of polyethylene terephthalate by a first stage ester-interchange between dimethyl terephthalate and ethylene glycol in the presence of an alkaline earth metal transesterification catalyst followed by a second stage catalytic polycondensation of the resulting diglycol terephthalate, the improvement which comprises: carrying out said second stage polycondensation in the presence of a polycondensation catalyst while introducing as a haze inhibitor after substantial completion of said transesterification at least about 0.001 mol percent, with reference to the initial dimethyl terephthalate, of an additive selected from the group consisting of hexafluorosilicic acid and calcium hexafluorosilicate and mixtures thereof.

2. A process as claimed in claim 1 wherein said additive is employed in an amount of about 0.01 to 0.1 mol percent, with reference to the initial dimethyl terephthalate.

3. A process as claimed in claim 2 wherein the additive is hexafluorosilicic acid.

4. A process as claimed in claim 2 wherein the additive is calcium hexafluorosilicate.

5. In the production of polyethylene terephthalate by a first stage ester-interchange between dimethyl terephthalate and ethylene glycol in the presence of a transesterification catalyst selected from the group consisting of calcium, strontium, barium and their oxides, hydrides, alcoholates and salts of fatty acids of from 2 to 20 carbon atoms, followed by a second stage polycondensation of the resulting diglycol terephthalate in the presence of a polycondensation catalyst selected from the group consisting of the oxides of boron, lead, germanium and antimony; the improvement which comprises carrying out said second stage polycondensation in the presence of at least 0.001 mol percent, with reference to the initial dimethyl terephthalate, of an additive selected from the group consisting of hexafluorosilicic acid and calcium hexafluorosilicate and mixtures thereof.

6. A process as claimed in claim 5 wherein said additive is employed in an amount of about 0.01 to 0.1 mol percent, with reference to the initial dimethyl terephthalate.

7. A process as claimed in claim 6 wherein the transesterification catalyst is calcium acetate and the polycondensation catalyst is antimony trioxide.

8. A process as claimed in claim 6 wherein the transesterification catalyst is strontium acetate and the polycondensation catalyst is antimony trixoide.

9. A process as claimed in claim 6 wherein the transesterification catalyst is barium acetate and the polycondensation catalyst is antimony trioxide.

References Cited

UNITED STATES PATENTS

| 2,577,618 | 12/1951 | Jayne et al. | 260—40 |
| 3,129,178 | 4/1964 | Ihde | 252—21 |
| 3,201,506 | 8/1965 | Bills | 264—210 |
| 3,228,913 | 1/1966 | Nesty et al. | 260—75 |

WILLIAM H. SHORT, *Primary Examiner.*

LOUISE P. QUAST, *Examiner.*